United States Patent
Mayo et al.

(10) Patent No.: US 7,546,475 B2
(45) Date of Patent: Jun. 9, 2009

(54) POWER-AWARE ADAPTATION IN A DATA CENTER

(75) Inventors: Robert N. Mayo, Mountain View, CA (US); Parthasarathy Ranganathan, Palo Alto, CA (US); Robert J. Stets, Jr., Palo Alto, CA (US); Deborah A. Wallach, Emerald Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 503 days.

(21) Appl. No.: 10/436,849

(22) Filed: May 13, 2003

(65) Prior Publication Data
US 2004/0230848 A1 Nov. 18, 2004

(51) Int. Cl.
*G06F 1/32* (2006.01)
(52) U.S. Cl. .................................... 713/320
(58) Field of Classification Search ............... 713/320
See application file for complete search history.

(56) References Cited

U.S. PATENT DOCUMENTS

| | | | | |
|---|---|---|---|---|
| 5,423,046 A | * | 6/1995 | Nunnelley et al. | 713/330 |
| 5,900,007 A | * | 5/1999 | Nunnelley et al. | 711/4 |
| 6,182,197 B1 | * | 1/2001 | Dias et al. | 711/151 |
| 6,728,748 B1 | * | 4/2004 | Mangipudi et al. | 718/105 |
| 6,799,254 B2 | * | 9/2004 | Oldfield et al. | 711/151 |
| 6,839,817 B2 | * | 1/2005 | Hyde et al. | 711/154 |
| 6,914,882 B2 | * | 7/2005 | Merani et al. | 370/230 |
| 6,934,864 B2 | * | 8/2005 | Chu et al. | 713/324 |
| 6,952,737 B1 | * | 10/2005 | Coates et al. | 709/229 |
| 6,990,593 B2 | * | 1/2006 | Nakagawa | 713/300 |
| 2002/0199129 A1 | * | 12/2002 | Bohrer et al. | 714/7 |

* cited by examiner

*Primary Examiner*—Thomas Lee
*Assistant Examiner*—Eric Chang

(57) ABSTRACT

A data center is disclosed with power-aware adaptation that minimizes the performance impact of reducing the power consumption of individual nodes in the data center. A data center according to the present techniques includes a request redirector that obtains an access request for data stored on a set of storage devices and that distributes the access request to one of a set of access nodes in response to a priority of the access request and a rank of each access node. A data center according to the present techniques also includes a power manager that performs a power adaptation in the data center by selecting access nodes for power reduction based on the ranks of the access nodes. The judicious distribution of access requests to appropriately ranked nodes and the judicious selection of access nodes for power reduction enhances the likelihood that higher priority cached data is not lost during power adaptation.

21 Claims, 3 Drawing Sheets

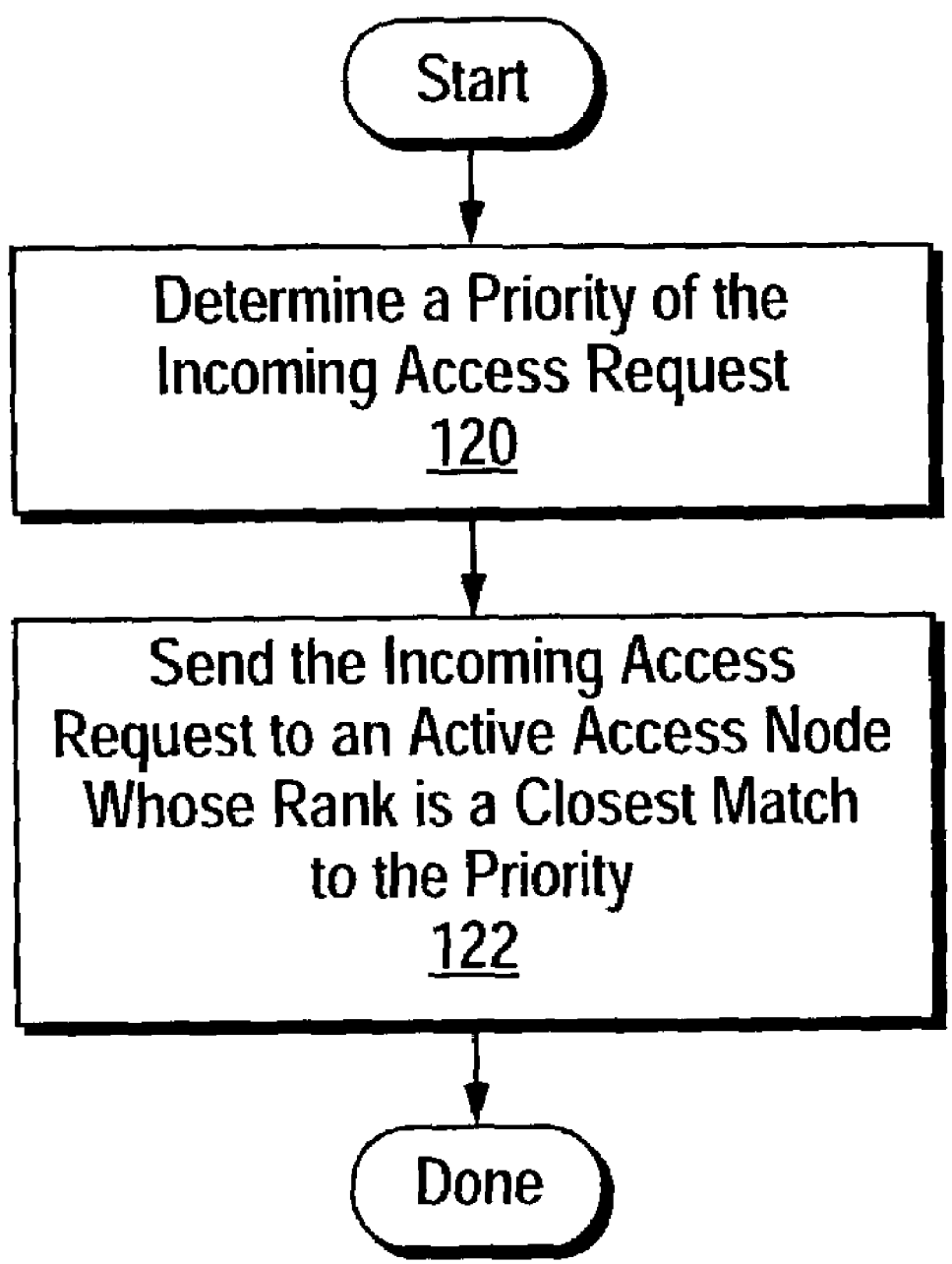

POWER-AWARE ADAPTATION IN A DATA CENTER

BACKGROUND

A typical data center includes a set of storage devices that provide persistent storage of data on a relatively large scale. For example, it is not uncommon for a large scale data center to include hundreds or thousands of disk drives.

A data center usually includes a set of access nodes that access data held in the storage devices in response to access requests. In a database application in a data center, for example, the access nodes typically handle database access requests such as SQL requests.

A typical access node in a data center includes an internal memory for caching data obtained from the storage devices in the data center. The caches in the access nodes of a data center usually improve the data access performance of the data center by reducing the response time to access requests when the requested data is available in a cache.

It is often desirable in a data center to reduce the power consumption of its access nodes. For example, it may be desirable to switch off some access nodes to reduce power consumption in the data center. In addition, it may be desirable to switch off access nodes to reduce heat in the data center environment. For example, a reduction in heat in a data center usually increases the reliability of hardware in the data center and usually enables more density in data center hardware. Unfortunately, prior techniques for reducing the power consumption of access nodes usually cause the loss of valuable cached data in a manner that severely impacts the overall response time performance in the data center.

SUMMARY OF THE INVENTION

A data center is disclosed with power-aware adaptation that minimizes the performance impact of reducing the power consumption of individual nodes in the data center. A data center according to the present techniques includes a request redirector that obtains an access request for data stored on a set of storage devices and that distributes the access request to one of a set of access nodes in response to a priority of the access request and a rank of each access node. A data center according to the present techniques also includes a power manager that performs a power adaptation in the data center by selecting access nodes for power reduction based on the ranks of the access nodes. The judicious distribution of access requests to appropriately ranked nodes and the judicious selection of access nodes for power reduction enhances the likelihood that higher priority cached data is not lost during power adaptation.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 3 shows a method for distributing an incoming access request according to the present teachings.

DETAILED DESCRIPTION

Figure 1:
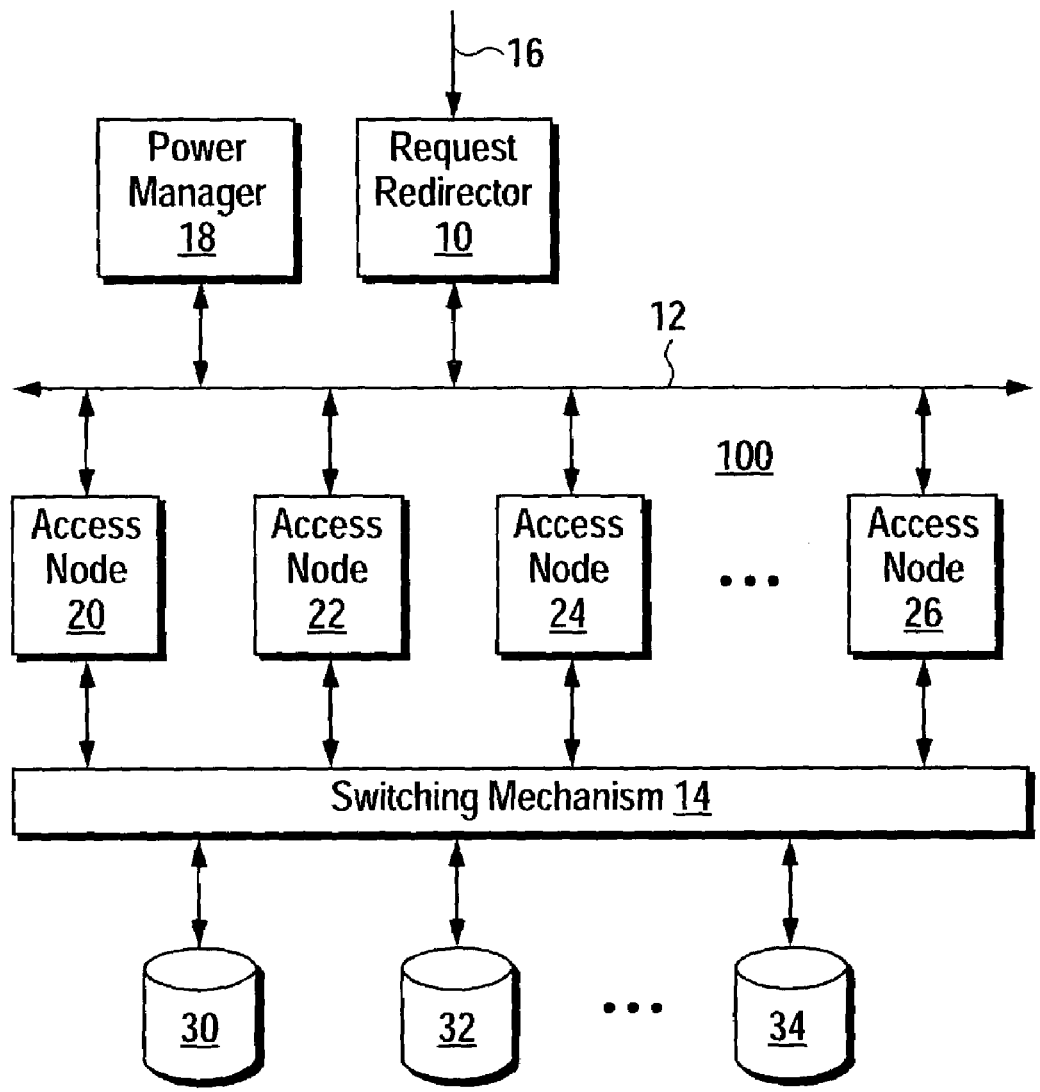
FIG. 1 shows a data center that incorporates the present teachings.

FIG. 1 shows a data center 100 that incorporates the present teachings. The data center 100 includes a set of storage devices 30-34, a set of access nodes 20-26, a request redirector 10, and a power manager 18. The data center 100 also includes a switching mechanism 14 that enables access to all of the storage devices 30-34 from all of the access nodes 20-26.

The storage devices 30-34 provide large scale persistent storage of data for applications implemented in the data center 100. In a database application, for example, the storage devices 30-34 provide a persistent store for database tables and records, etc.

The request redirector 10 obtains incoming access requests via a communication path 16 and distributes the incoming access requests to the access nodes 20-26 via an internal network 12. In a database application in the data center 100, for example, the access requests may be database reads, writes, queries, etc.

The access nodes 20-26 perform reads from and/or writes to the storage devices 30-34 via the switching mechanism 14 to access persistent data as needed when carrying out the access requests received from the request redirector 10. Each of the access nodes 20-26 includes an internal non-persistent memory, for example random access main memory, that is used as a cache for holding subsets of the data that is held persistently on the storage devices 30-34.

The power manager 18 monitors power consumption and/or environmental and/or other conditions in the data center 100 and performs power adaptation when appropriate. In one embodiment, the power adaptations by the power manager 18 are triggered automatically—for example through programmed heuristics. Alternatively, the power adaptations may be triggered manually—for example through the intervention of a system administrator.

For example, an excessive amount of power consumption or heat in the data center 100 may cause the power manager 18 to perform power adaptation by powering down or reducing the power consumption of one or more of the access nodes 20-26 that is currently active. The data center 100 may include sensors for measuring power consumption and/or environmental temperature and the power manager 18 obtains the readings and triggers a power adaptation if the readings exceed a predetermined threshold.

In another example, if the load of incoming access requests received by the request redirector 10 cannot be adequately handled by the active ones of the access nodes 20-26 then the power manager 18 may perform power adaptation by powering up inactive ones of the access nodes 20-26. The power manager 18 or some other element in the data center may implement mechanisms for measuring response time to access requests and an increase in response time may trigger power adaptation.

The above provide a few examples of conditions that my trigger power adaptation in the data center 100. A variety of conditions may cause the power manager 18 to trigger power adaptation.

Each of the access nodes 20-26 is individually ranked for power adaptation in the data center 100. The nodes 20-26 may be ranked in any manner. For example, if there are N nodes then the node 20 may be assigned a rank=1 and the node 22 a rank=2, etc., or visa versa. Any numbering system or rank indicators may be used. More than one of the nodes 20-26 may be assigned the same rank and there may be any number of ranks assigned.

The power manager 18 selects the access nodes 20-26 to be powered down on the basis of their assigned rank. For example, the power manager 18 initially powers down the access node have the lowest rank that is currently active and then powers down the access node having the next lowest rank that is currently active, etc., as needed to accomplish the appropriate power adaptation in the data center 100. After one or more of the nodes 20-26 is switched off the request redirector 10 routes incoming access requests to the remaining active access nodes 20-26.

In addition, the power manager 18 selects the access nodes 20-26 for powering up on the basis of their assigned rank. For example, the power manager 18 initially powers up the access node having the highest rank that is currently not active or that is in a reduced power state and then powers up the access node having the next highest rank that is currently not active, etc., as needed to accomplish the appropriate power adaptation in the data center 100. After one or more of the inactive nodes 20-26 is switched on the request redirector 10 can route incoming access requests to the newly active access nodes.

The power manager 18 may power up and power down individual access nodes by transferring messages to power units associated with the access nodes 20-26 via the internal network 12 or using direct communication to power units associated with the access nodes 20-26. Alternatively, access nodes may be powered up and down manually. The request redirector 10 may be notified either automatically or manually of an upcoming change in the on/off status of individual access nodes so that incoming requests may be redirected accordingly.

The request redirector 10 distributes incoming access requests received via the communication path 16 to the active ones of the access nodes 20-26 on the basis of priorities associated with the access requests and the ranks of the access nodes. The request redirector 10 selects one of the access nodes 20-26 to handle an incoming access request by matching a priority of the incoming access request to the ranks of the access nodes 20-26. The request redirector 10 transfers the access requests having a high priority to the access nodes 20-26 that have a high rank and transfers the access requests having a low priority to the access nodes 20-26 that have a low rank.

The priorities of the incoming access requests may employ a system similar to the ranking of the access nodes 20-26. For example, if the access nodes are ranked from 1 to N then an incoming access request may have a priority between 1 and N. In such an embodiment, an access request having a priority=1 is sent to the access node having a rank=1 and an access request having a priority=2 is sent to the access node having a rank=2, etc. Alternatively, any type of mapping between ranks of access nodes and priorities of incoming access requests may be used.

If low ranking access nodes are not active when an incoming low priority access request is received then the request redirector 10 sends the low priority access requests to the lowest ranking active node. In the example 1-N ranking and priorities, if the access node assigned a rank=1 is not active when an access request having a priority=1 is received then the access request having a priority=1 is sent to the access node having a rank=2 if it is active and to the access node having a rank=3 if it is active, etc.

The priorities of the incoming access requests may be included with the incoming access requests or may be assigned by the request redirector 10. Any method may be employed to assign priorities to an access request. For example, clients associated with access requests may pay more money in exchange for a higher priority on their access requests. In another example, the request redirector 10 may analyze and compute statistics on incoming access requests and assign priorities accordingly. In another example, the priority of an incoming access request may be based on the data targeted by the access request so that some data in the data center 100 is deemed higher priority than other data.

The present techniques increase the likelihood that data for high priority access requests will be cached in active access nodes because the access nodes that handle lower priority requests are powered down first. This minimizes the performance degradation that might otherwise occur when nodes are powered down without regard to their rank, i.e. the priority of access requests that they handle.

The request redirector 10 may be implemented as code on a node having computing resources and communication resources. A request redirector node may be dedicated as a request redirector or perform other application functions. For example, a request redirector may be implemented as code on a web server that issues access requests to the access nodes 20-26 that function as database servers. The data center 100 may includes multiple request redirectors that receive and distribute incoming access requests.

Figure 2:
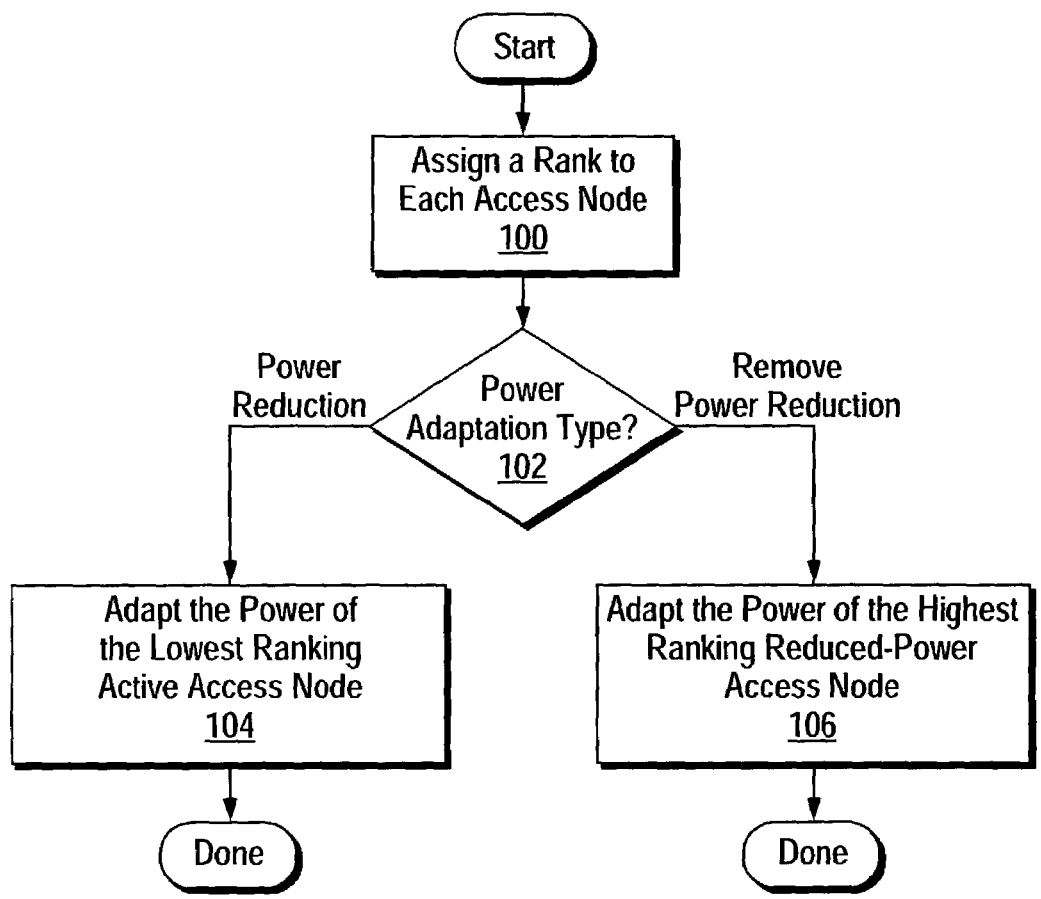
FIG. 2 shows a method for power adaptation in a data center according to the present teachings.

FIG. 2 shows a method for power adaptation in the data center 100 according to the present teachings. At step 100, a rank is assigned to each of the access nodes 20-26. The following focuses on an example embodiment in which the access nodes 20-26 include a set of 4 nodes which are assigned the ranks 1 through 4, respectively, at step 100.

At decision step 102, if a power reduction type of adaptation is triggered then step 104 is performed and if removal of power reduction type of adaptation is triggered then step 106 is performed.

At step 104, the power manager 18 selects the lowest ranking active access node and adapts it for reduced power consumption. A selected access node may be adapted for reduced power consumption by powering it down, i.e. switching it off, or by slowing it down using, for example, voltage and frequency scaling. Other methods of power control may also be employed.

For example, if the access nodes 20-26 are all active then the access node 20 may be powered down at step 104. This results in the loss of cached data for the lowest priority access requests which were handled by the lowest ranking access node 20. At step 104, if the access nodes 22-26 only are active then the access node 22 may be powered down resulting in the loss of its relatively low priority cached data.

At step 106, the power manager 18 selects the highest ranking reduced power, e.g. powered down, access node and adapts it to remove power reduction. A selected access node may be adapted to remove power reduction by powering it up, i.e. switching it on, or by speeding it up using, for example, voltage and frequency scaling. Other methods of power control may also be employed.

For example, if the access nodes 20 and 22 are inactive then the access node 22 may be powered up at step 106 because its rank is higher than the rank of the access node 20. This recreates the capacity to cache data associated with the priority of access requests that are routed to the access node 22.

FIG. 3 shows a method for distributing an incoming access request according to the present teachings. The method steps shown in one embodiment are performed by the request redirector 10.

At step 120, the request redirector 10 determines a priority for the incoming access request. Any method may be used to determine priority at step 120. The priority of the incoming access request may be included in the access request or may be derived from information contained in the access request.

For example, priority may be derived from an identity of an originator of the access request or from the data to which the access request is targeted. In this example embodiment, the priority of the incoming access request has a range of 1-4 with priority=4 being the highest priority.

At step 122, the request redirector 10 sends the incoming access request to an active access node whose rank has the closest match to the priority of the incoming access request. For example, if the incoming access request has a priority=1 then it is sent to the access node 20 which has a rank=1 if the access node 20 is active. If the access node 20 is not active then the incoming access request with priority=1 is sent to the access node 22, and if the access node 22 is not active then the incoming access request is sent to the node 24, and so on.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A data center, comprising:
    request redirector that obtains an access request for data stored on a set of storage devices and that distributes the access request to one of a set of access nodes in response to (1) a priority of the access request and (2) a rank of each access node, wherein the access request is distributed by matching the priority of the access request with a rank of the one of a set of access nodes;
    power manager that powers down access nodes having a lowest rank and powers up access nodes having a highest rank to perform a power adaptation in the data center.

2. The data center of claim 1, wherein the request redirector selects the access node for processing the access request by matching the priority of the access request to the ranks of the access nodes.

3. The data center of claim 2, wherein the request redirector selects the access node having the rank that is a closest match to the priority.

4. The data center of claim 1, wherein the request redirector assigns the priority to the access request.

5. The data center of claim 1, wherein the priority is carried in the access request which is obtained via a network.

6. The data center of claim 1, wherein the priority is determined by the data targeted by the access request.

7. The data center of claim 1, wherein the power adaptation is triggered by a relatively high rate of power consumption in the data center.

8. The data center of claim 1, wherein the power adaptation is triggered by a relatively high level of heat in the data center.

9. The data center of claim 1, wherein the power adaptation is triggered by a relatively slow response time in the data center.

10. The data center of claim 1, wherein the power manager performs the power adaptation by switching off the access node having a lowest rank of the active ones of the access nodes.

11. The data center of claim 1, wherein the power manager performs the power adaptation by switching on the access node having a highest rank of the inactive ones of the access nodes.

12. A method for power-aware adaptation in a data center, comprising:
    obtaining an access request for data stored on a set of storage devices in the data center;
    distributing the access request to one of a set of access nodes to the storage devices in response to a priority of the access request and a rank of each access node by matching the priority of the access request with a rank of the one of a set of access nodes;
    performing a power adaptation in the data center by powering down access nodes having a lowest rank and powering up access nodes having a highest rank.

13. The method of claim 12, wherein the step of distributing includes the step of matching the priority of the access request to the ranks of the access nodes.

14. The method of claim 12, wherein the step of distributing includes the step of selecting the access node having the rank that is a closest match to the priority.

15. The method of claim 12, wherein the step of obtaining includes the step of assigning the priority to the access request.

16. The method of claim 15, wherein the step of assigning includes the step of assigning the priority to the access request in response to the data targeted by the access request.

17. The method of claim 12, wherein the step of performing a power adaptation comprises the step of performing the power adaptation in response to a relatively high rate of power consumption in the data center.

18. The method of claim 12, wherein the step of performing a power adaptation comprises the step of performing the power adaptation in response to a relatively high level of heat in the data center.

19. The method of claim 12, wherein the step of performing a power adaptation comprises the step of performing the power adaptation in response to a relatively slow response time in the data center.

20. The method of claim 12, wherein the step of performing a power adaptation comprises the step of switching off the access node having a lowest rank of the active ones of the access nodes.

21. The method of claim 12, wherein the step of performing a power adaptation comprises the step of switching on the access node having a highest rank of the inactive ones of the access nodes.

* * * * *